United States Patent [19]
Hashimoto

[11] Patent Number: 6,099,249
[45] Date of Patent: Aug. 8, 2000

[54] STRUCTURE OF OUTPUT SECTION OF JET PROPULSION ENGINE OR GAS TURBINE

[75] Inventor: Keisuke Hashimoto, Kobe, Japan

[73] Assignee: Kawasaki Jukogyo Kabushiki, Hyogo, Japan

[21] Appl. No.: 08/877,173

[22] Filed: Jun. 17, 1997

[30] Foreign Application Priority Data

Aug. 9, 1996 [JP] Japan ................................ 8-227763

[51] Int. Cl.$^7$ .................................................... F01D 1/02
[52] U.S. Cl. ...................... 415/199.4; 415/181; 415/914; 416/198 A
[58] Field of Search ............................. 415/199.4, 199.5, 415/181, 914, 119; 416/198 A

[56] References Cited

U.S. PATENT DOCUMENTS

| | | | |
|---|---|---|---|
| 2,313,413 | 3/1943 | Weske | 415/199.4 |
| 2,935,246 | 5/1960 | Roy | 230/120 |
| 3,173,604 | 3/1965 | Sheets et al. | 415/207 |
| 3,195,807 | 7/1965 | Sheets | 415/199.4 |
| 3,442,441 | 5/1969 | Dettmering | 415/181 |
| 3,867,062 | 2/1975 | Troller | 415/914 |
| 4,102,600 | 7/1978 | Schwab | 416/91 |
| 4,199,296 | 4/1980 | de Chair | 415/181 |
| 4,558,987 | 12/1985 | Dittié | 415/162 |
| 4,874,287 | 10/1989 | Grieb | 415/149 |
| 4,915,580 | 4/1990 | Obidniak | 415/907 |
| 5,167,383 | 12/1992 | Nozaki | 244/12.5 |

FOREIGN PATENT DOCUMENTS 0 560 372  9/1993  European Pat. Off. .
7-3181   5/1993  Japan .
9-13989  6/1995  Japan .

OTHER PUBLICATIONS

European Search Report, International Application No. 97 30 4151, dated Jun. 1, 1999.
Abstract of International Application No. 97 30 4151.
The Jet Engine–p. 16– issued by Rolls–Royce pic on Mar. 31, 1992.
An ASME Publication (Paper No. 79–GT–125).
An ASME Publication (Paper No. 80–GT–39.
Gatzen B.S. & Reynolds, C.N.,I.C.A. Paper ICAS–84–5.6.2 (1984).

*Primary Examiner*—Edward K. Look
*Assistant Examiner*—Richard Woo
*Attorney, Agent, or Firm*—Marshall, O'Toole, Gerstein, Murray & Borun

[57] ABSTRACT

A tandem blade lattice having characteristics enhanced is provided. In a high pressure ratio blade lattice, inevitable generation of an shock wave is shifted, as much as possible, toward a rear portion of an upper surface of a front blade to inhibit separation from a blade surface from being caused by interference of the shock wave and a boundary layer, and boundary layer control is performed such that a speed, a momentum and the like of a jet flowing from a trailing edge of a lower surface of the front blade onto an upper surface of a rear blade are regulated to obtain a flow along the upper surface of the rear blade, so that separation of the boundary layer on the upper surface of the rear blade is restricted to a vicinity of a trailing edge.

14 Claims, 10 Drawing Sheets

STRUCTURE OF OUTPUT SECTION OF JET PROPULSION ENGINE OR GAS TURBINE

FIELD OF THE INVENTION

The present invention relates to a structure of an output section of a jet propulsion engine or a gas turbine, and a tandem blade lattice, and more particularly to a structure of an output section of a jet propulsion engine or a gas turbine which can conventionally rotate at a higher speed than in the prior art and a tandem blade lattice suitable for the structure of the output section.

DESCRIPTION OF BACKGROUND ART

In the prior part, various proposals have been made in order to enhance outputs of a jet propulsion engine such as a turbojet engine, turbofan jet engine, a turboshaft engine, a ram-jet engine or an air turbo ram-jet engine and gas turbine. As an example of the proposals, an advanced turboprop engine (hereinafter referred to as an ATP) to have a bypass ratio of about 40 to 50 has been proposed (see page 16 and the like of "THE JET ENGINE" written by Rolls-Royce pic, publication of Japan Air Technical Association Co.) As shown in FIG. 14, for example, it has been planned that the ATP has a structure in which a gas flow section G is provided on a central portion side and contrarotating propeller blades 51 and 52, that is, air flow section A are provided on the outside of gas flow section G (see Gatzen. B. S & Reynolds, C. N.; I.C.A.S Paper ICAS-84-5.6.2(1984)).

As is well known, the outputs of the jet propulsion engine and gas turbine can also be enhanced by increasing an engine speed. Consequently, it is desirable that an engine speed of the ATP should be increased as much as possible.

As described above, however, the ATP has the gas flow section G formed on the central portion side. For this reason, a hot section is present on the central portion side. Consequently, the engine speed is determined by a material strength against centrifugal force acting on that portion. In other words, there is a problem that the engine speed is limited. Currently, a width of a blade such as a propeller tends to be increased, which results in that the above mentioned problem is being promoted still more.

In an axial-flow compressor, if a pressure ratio in a single stage exceeds about 1.5, a shock wave S is generated between adjacent moving blades M and M provided in a moving blade line as shown in FIG. 15. In general, the shock wave S is generated from a leading edge of a lower surface (pressure surface) of the moving blade M to an intermediate portion of an upper surface (suction surface) of the adjacent moving blade M as shown. In the downstream of the shock wave S, accordingly, an air flow (a boundary layer) separates from the upper surface of the blade. Therefore, performance of the compressor is lowered.

In order to solve the problems according to the prior art, it is an object of the present invention to provide a structure of an output section of a jet propulsion engine or a gas turbine which has a gas flow section provided on a central portion side and an air flow section provided on an outside of the gas flow section, characterized in that centrifugal force acting on the gas flow section is reduced so that an engine speed can be enhanced more than in the prior art.

In order to achieve the above-mentioned object of the present invention, a concept of boundary layer control to be used to prevent a boundary layer from separating from a blade surface and stalling in a lower speed region is applied, in an aircraft, to the structure of the output section of the jet propulsion engine or the gas turbine in a supersonic region.

SUMMARY OF THE INVENTION

The present invention provides a structure of an output section of a jet propulsion engine or a gas turbine (hereinafter referred to as the structure of an output section), comprising a gas flow section formed on a central portion side, and an air flow section formed on an outside of the gas flow section, wherein each blade of the air flow section is a tandem blade including a front blade and a rear blade.

According to the present invention, a fan of the air flow section is formed by a tandem blade lattice. Therefore, a thickness and a width of each blade are about a half of those of a fan according to the prior art. As a result, a sectional area of the blade is about a quarter of that of the blade according to the prior art. Accordingly, a weight of the fan is about a half of that of the fan according to the prior art. At the same engine speed, therefore, the centrifugal force of the fan is about a half of that of the fan according to the prior art. Consequently, the engine speed can be increased corresponding to the fan according to the prior art. In addition, an output of an engine can be increased with an increase in the engine speed.

It is preferable that a tandem blade lattice should be formed by integral molding in order to reduce the number of parts, a manufacturing cost, and a weight of a product.

Preferably, the tandem blade lattice is formed such that a shock wave is generated in a position connecting a vicinity of a leading edge of a lower surface of each front blade to that of a trailing edge of an upper surface of the other front blade adjacent to said front blade.

Furthermore, it is preferred that the tandem blade lattice should be formed in such a manner that an air flow spouted onto the upper surface of the rear blade from a gap between a trailing edge of the front blade and the leading edge of the rear blade in each tandem blade maintains a boundary layer on the upper surface of the rear blade.

The present invention provides a tandem blade lattice in which a shock wave is formed in a position connecting a vicinity of a leading edge of a lower surface of each front blade to that of a trailing edge of an upper surface of the other front blade adjacent to said front blade, and a speed and a momentum of an air flow spouted from the trailing edge of the lower surface of the front blade onto the upper surface of the rear blade are regulated such that the air flows along the upper surface of the rear blade, thereby restricting separation of a boundary layer on the upper surface of the rear blade to a vicinity of a trailing edge.

The tandem blade lattice according to the present invention has the above-mentioned structure. Therefore, when increasing a pressure ratio, the shock wave can be generated between the blade lattices in the vicinity of the trailing edge of the front blade. In addition, the separation of the boundary layer of the rear blade can be prevented by operation of controlling the boundary layer of the front blade. Consequently, a pressure ratio for each single stage of the tandem blade lattice can be increased while keeping a high adiabatic efficiency. For example, the pressure ratio for each single stage can be set to about 2.4 with an adiabatic efficiency of about 87%.

The present invention provides a tandem blade in which the speed and the momentum of a jet spouted from a trailing edge of a lower surface of a front blade onto an upper surface of a rear blade are regulated such that the jet flows along the upper surface of the rear blade, thereby restricting generation of separation of a boundary layer on the upper surface of the rear blade to a vicinity of a trailing edge.

DETAILED DESCRIPTION OF PREFERRED EMBODIMENT

A preferred embodiment of the present invention will be described below with reference to the drawings. The present invention is not restricted to the following embodiment.

Figure 1:
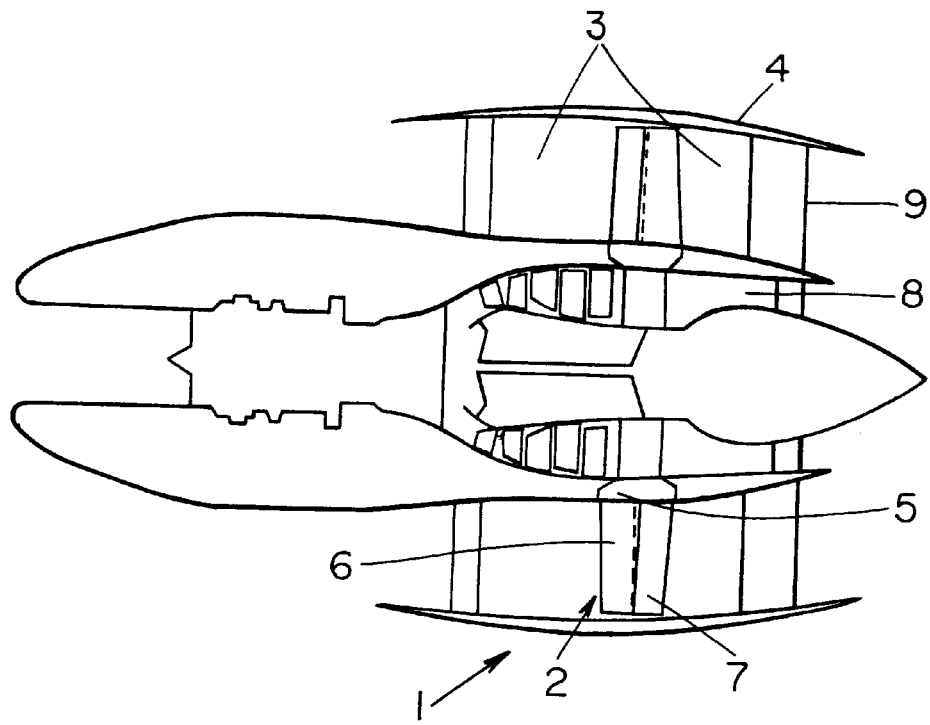
FIG. 1 is a schematic view showing an example of a jet propulsion engine to which a tandem blade lattice according to an embodiment of the present invention is applied.
Figure 2:
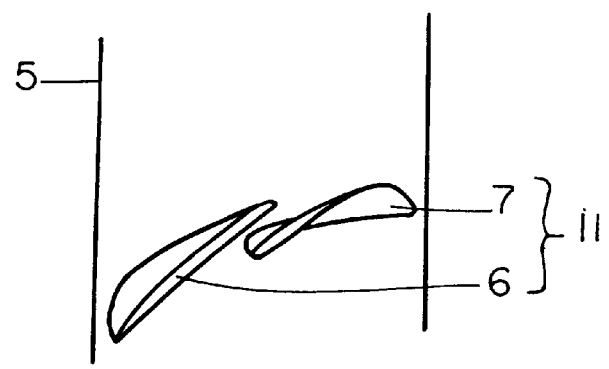
FIG. 2 is a schematic view showing the tandem blade lattice in FIG. 1.
Figure 14:
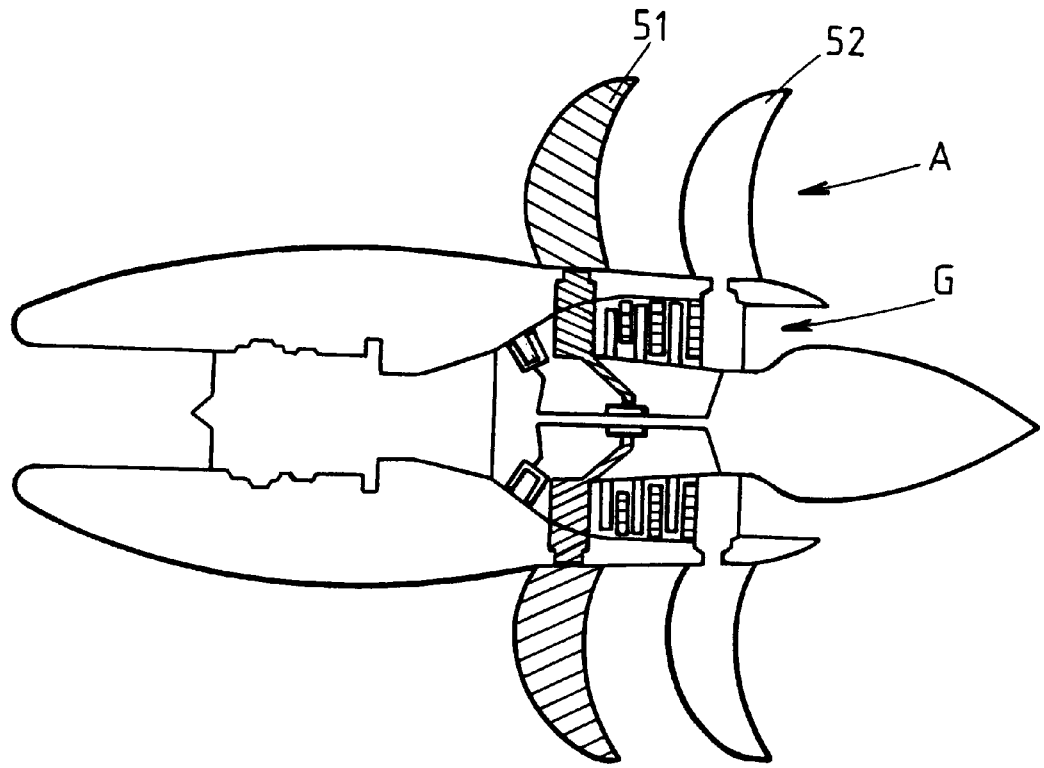
FIG. 14 is a schematic view showing an advanced turbo-prop engine according to the prior art.
Figure 15:
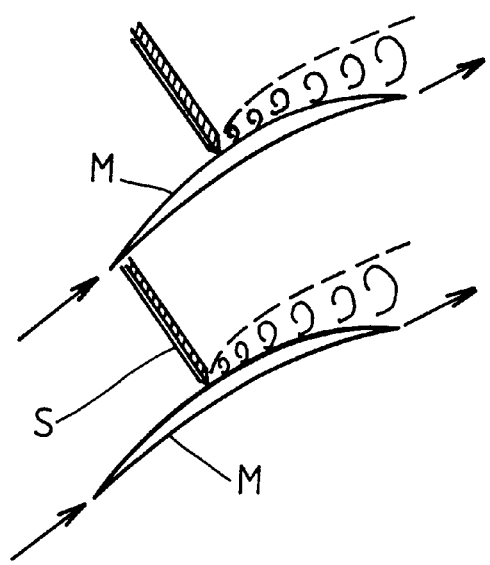
FIG. 15 is a typical view showing an air flow in a moving blade lattice according to the prior art.

FIG. 1 schematically shows a structure of an output section of a jet propulsion engine according to an embodiment of the present invention (which is indicated at 1). In the structure 1 of the output section, blades 51 and 52 of contrarotating propellers of an ATP air flow section according to the prior art shown in FIG. 14 are formed by a tandem blade lattice 2 shown in FIG. 2, and a casing 4 for forming an air flow section 3 is provided on a periphery. The reference numeral 5 denotes a disk having a rising tandem blade 11 on a periphery thereof.

In the present embodiment, thicknesses and widths of a front blade 6 and a rear blade 7 of the lattice 2 of the tandem blade 11 (tandem blade lattice) are set to about a half of those of the blade 51 or 52 according to the prior art (shown in FIG. 14), respectively. Therefore, weights of the front and rear blades 6 and 7 are set to about a quarter of those of the blades according to the prior art. Accordingly, a whole weight of the air flow section 3 is set to about a half of that of the air flow section according to the prior art. At the same engine speed, consequently, centrifugal force acting on a gas flow section 8 can be reduced to about a half of the centrifugal force according to the prior art. As a result, the engine speed can be increased correspondingly. Thus, an output of an engine can generally be enhanced corresponding to an increase in the engine speed.

In FIG. 1, the reference numeral 9 denotes a stator blade for changing a flow from the tandem blade lattice 2 to a predetermined direction.

Figure 3:
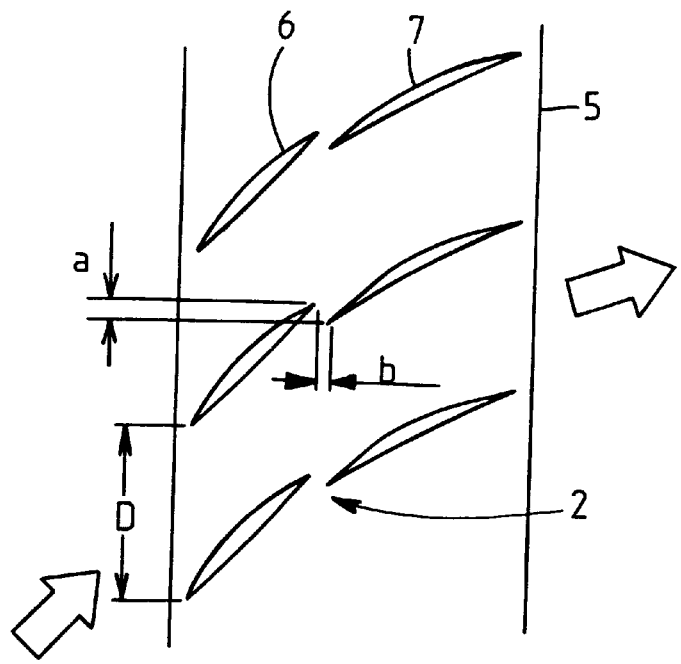
FIG. 3 is a diagram showing a positional relationship between a front blade and a rear blade of the tandem blade lattice in FIG. 1.

In the present embodiment, shapes of the front and rear blades 6 and 7 of the tandem blade 11, a positional relationship between the front and rear blades 6 and 7 (gaps "a" and "b", and the like), a blade lattice pitch D of the tandem blade lattice 2 shown in FIG. 3 and the like are set in the following manner by performing three-dimensional calculation fluid dynamics using a computer.

Figure 4:
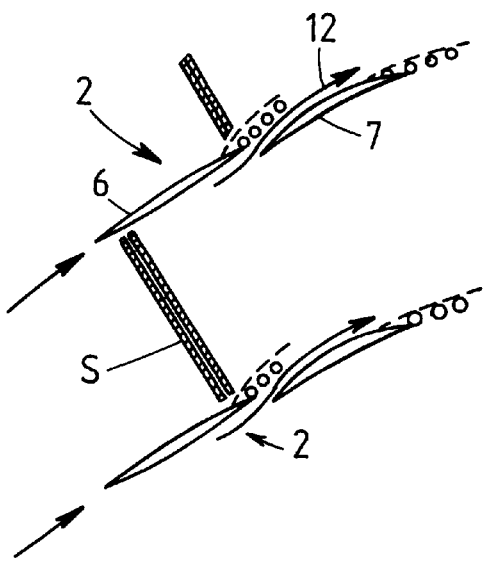
FIG. 4 is a typical view showing an air flow of the tandem blade lattice in FIG. 1.

As typically shown in FIG. 4, a shock wave S is formed in a position connecting a vicinity of a leading edge of a lower surface of one of the adjacent front blade 6 to that of a trailing edge of an upper surface of the other front blade 6. This formation is performed by setting a proper shape of the front blade 6 by a MCA (multi-circle airfoil) designing method. More specifically, the shock wave S is generated in the vicinity of the leading edge of the lower surface of the front blade 6 and arrives at the vicinity of the trailing edge of the upper surface of the other front blade 6 depending on the proper shape thereof.

By regulating a speed and a momentum of an air jet 12 spouted from a gap between the trailing edge of the lower surface of the front blade 6 and the leading edge of the upper surface of the rear blade 7 onto the upper surface of the rear blade 7, the air jet 12 is caused to flow along the upper surface of the rear blade 7 so that a boundary layer of the upper surface of the rear blade 7 can be maintained. In other words, separation of the boundary layer on the upper surface of the rear blade 7 is set to be restricted to the vicinity of the trailing edge. Consequently, the boundary layer can be maintained also in the vicinity of a HUB section where the separation is easily caused. This is mainly performed by setting a proper gap between the trailing edge of the lower surface of the front blade 6 and the leading edge of the upper surface of the rear blade 7 and a proper shape of the rear blade 7.

While the shock wave can be generated in the vicinity of the trailing edge of the upper surface of the front wave only by using the tandem blade lattice, it can be generated closer to the trailing edge by the above-mentioned dynamics.

By shifting the inevitable generation of the shock wave S in a high pressure ratio blade lattice toward a rear portion of the upper surface of the front blade 6 as much as possible, the separation from a blade surface can be inhibited from being caused by interference between the shock wave S and the boundary layer. In addition, the air flow from the gap to the upper surface of the rear blade 7 can be regulated so that the boundary layer on the upper surface of the rear blade 7 can be maintained. Thus, the boundary layer of the rear blade 7 can be controlled by the front blade 6. In this case, any program for three-dimensionally analyzing a flow around the blade lattice and a distribution of the shock wave S can be used, and an application program thereof is not restricted.

Figure 5:
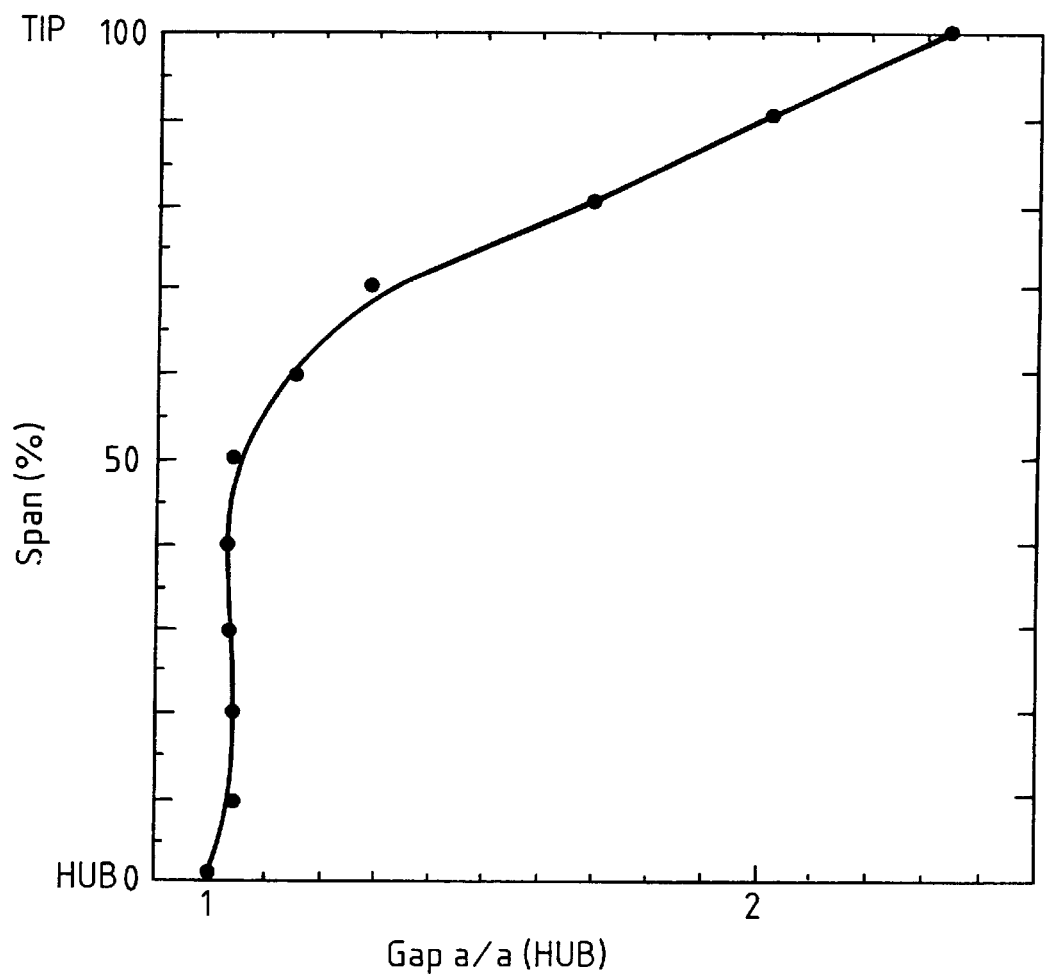
FIG. 5 is a view showing a gap between tandem blades (the front and rear blades) according to the embodiment of the present invention.
Figure 6:
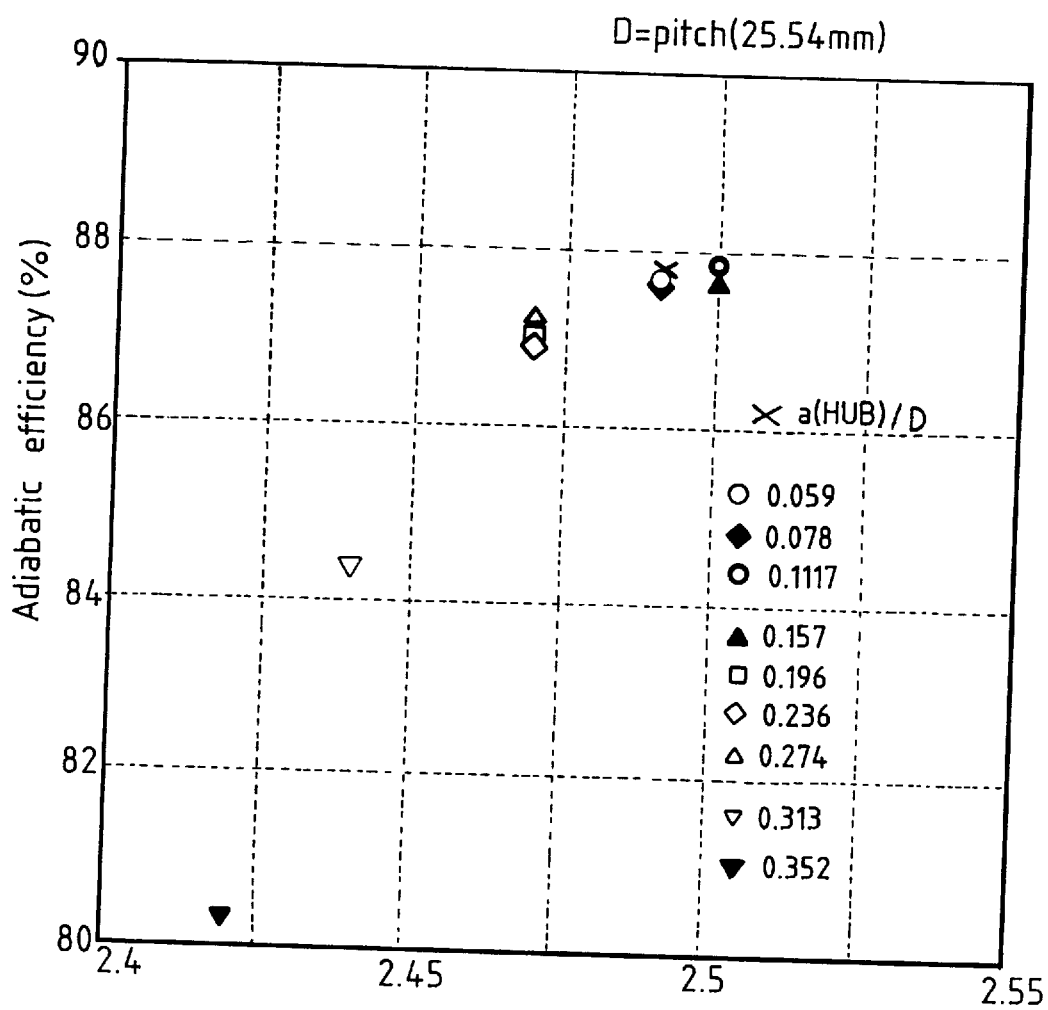
FIG. 6 is a diagram showing a relationship of a pitch of the tandem blade lattice with the gap between the tandem blades (the front and rear blades) according to the embodiment of the present invention.

FIGS. 5 and 6 show examples of a gap between the trailing edge of the lower surface of the front blade 6 and the leading edge of the upper surface of the rear blade 7 suitable for maintaining the boundary layer on the upper surface of the rear blade 7 obtained by the three-dimensional calculation fluid dynamics.

FIG. 5 shows a gap "a" between the front and rear blades of the tandem blade 11 from a HUB section side to a TIP section side in the tandem blade lattice 2 having a certain blade lattice pitch. In FIG. 5, the gap "a" is represented by dimensionless numerals by using a ratio of a/a (HUB) of the gap "a" in each portion of the blade to the gap "a" (HUB) between the front and rear blades on a HUB surface (see FIG. 3).

FIG. 6 shows an adiabatic efficiency and a pressure ratio of each of the tandem blade lattices 2 having different gaps "a" between the front and rear blades to the blade lattice pitch.

In FIG. 6, dimensionless numerals are represented by using a ratio D/a (HUB) of the gap "a" (HUB) between the front and rear blades on the HUB surface to the gap D (the blade lattice pitch) between the adjacent tandem blades 11 of each tandem blade lattice 2. As is apparent from FIG. 6, if the tandem blade lattice 2 has the ratio D/a (HUB) which is less than about 0.3, a high efficiency can be obtained with a high pressure ratio. If the tandem blade lattice 2 has the ratio D/a (HUB) which is equal to or less than about 0.15, a much higher efficiency can be obtained with a higher pressure ratio.

Figure 7:
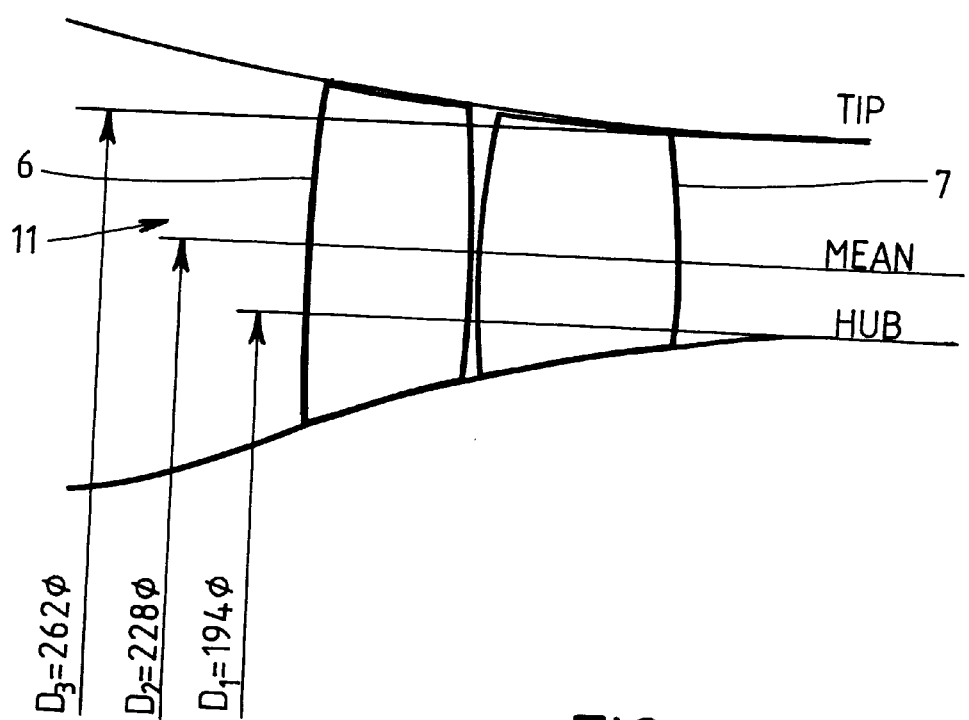
FIG. 7 is a side view showing the tandem blade lattice according to the embodiment of the present invention.
Figure 8:
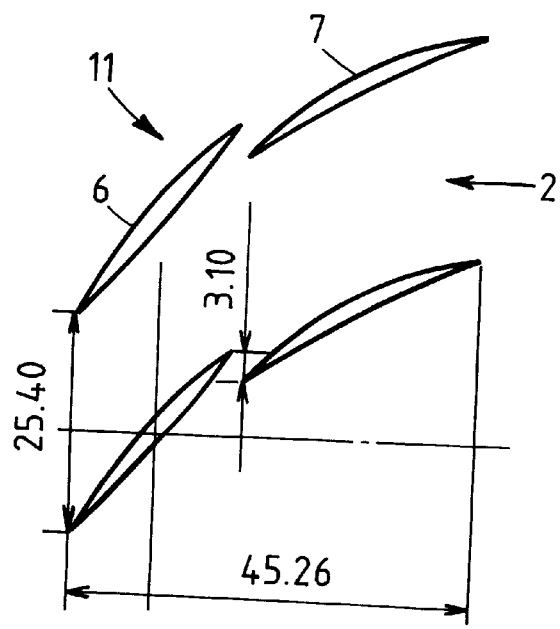
FIG. 8 is a cross-sectional view showing a HUB section of the tandem blade lattice in FIG. 7.
Figure 9:
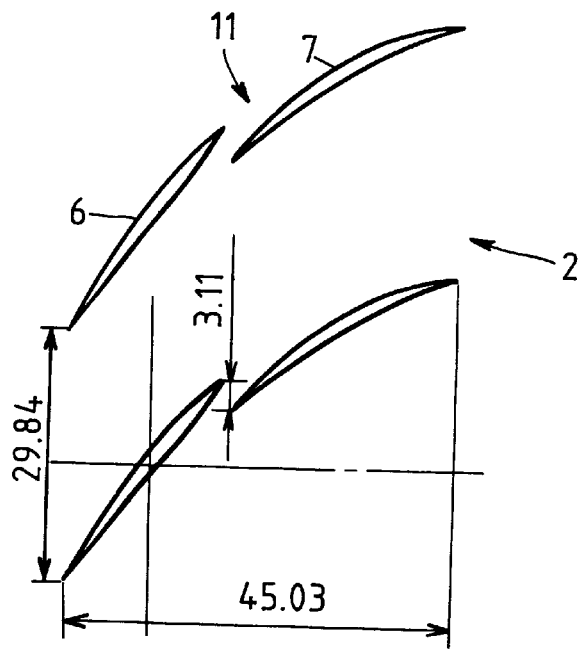
FIG. 9 is a cross-sectional view showing a MEAN section of the tandem blade lattice in FIG. 7.
Figure 10:
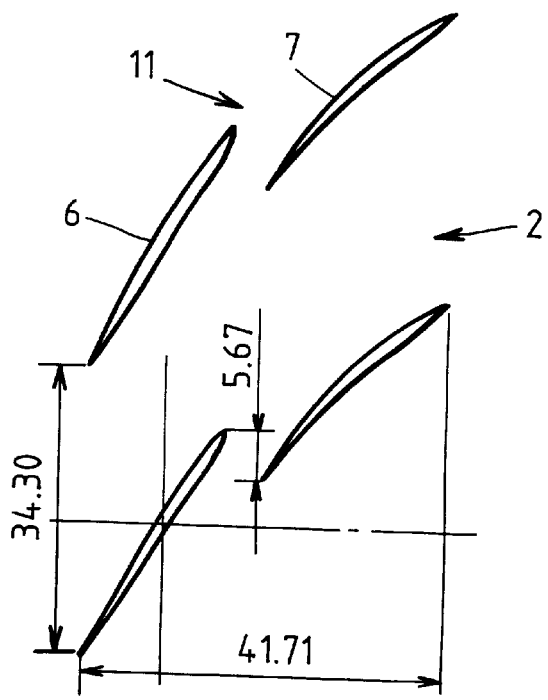
FIG. 10 is a cross-sectional view showing a TIP section of the tandem blade lattice in FIG. 7.

FIGS. 7 to 10 show specific examples of a positional relationships between the front and rear blades 6 and 7 of the tandem blade 11 and between the tandem blades 11 which are obtained by the above-mentioned method. A dimensional relationship between the front and rear blades 6 and 7 is set as shown. FIG. 8 is a cylindrically sectional view taken along the line HUB shown in FIG. 7, FIG. 9 is a cylindrically sectional view taken along the line MEAN shown in FIG. 7, and FIG. 10 is a cylindrically sectional view taken along the line TIP shown in FIG. 7. A mutual relationship between the front blade 6 and the rear blade 7 is changed from a state in which the front blade 6 and the rear blade 7 are laid down together from the HUB section to the TIP section (that is, an inclination of the HUB to an axis is small) to a state in which they rise together (that is, the inclination of the HUB to the axis is great) so that the gap between the front and rear blades 6 and 7 is gradually increased from the HUB section to the TIP section. In other words, if the front and rear blades 6 and 7 are twisted together in the same direction, the gradual increase can be obtained.

Figure 11:
FIG. 11 is a chart showing a distribution of a shock wave obtained by a simulation of an air flow around the HUB section of the tandem blade lattice according to the embodiment of the present invention.

FIG. 11 shows a distribution of the shock wave obtained by a simulation of an air flow around the HUB of the tandem blade lattice 2. In general, the shock wave is inevitably generated between transonic blade lattices having a high load. A great separation flow is generated by interference between the shock wave and the boundary layer on the blade surface. The great separation flow is a main factor of a reduction in the adiabatic efficiency. While a pressure ratio in a single stage is generally about 1.8 in the prior art, a pressure ratio of 2.7 can be set in the single stage of the tandem blade lattice 2, which will be described below. However, it is apparent from FIG. 11 that the shock wave is generated in only the vicinity of the trailing edge side between the front blades (the front blades 6) and a separation flow area caused by the interference with the boundary layer on the blade surface is kept small in respect of the pressure ratio of the tandem blade lattice 2 which is 1.5 times as high as that of the prior art. Furthermore, it is apparent that the rear blade 7 keeps the boundary layer without an influence of the separation flow and normally operates. In other words, it is found that a bad influence can be inhibiting from being caused by the interference between mutual shock waves of the tandem blades 11.

It is preferable that the tandem blade lattice 2 and the disk 5 should be cast integrally in order to reduce the number of parts, the manufacturing cost and the weight.

A more specific embodiment of the present invention will be described below in more detail.

EMBODIMENT AND COMPARATIVE EXAMPLE

Figure 12:
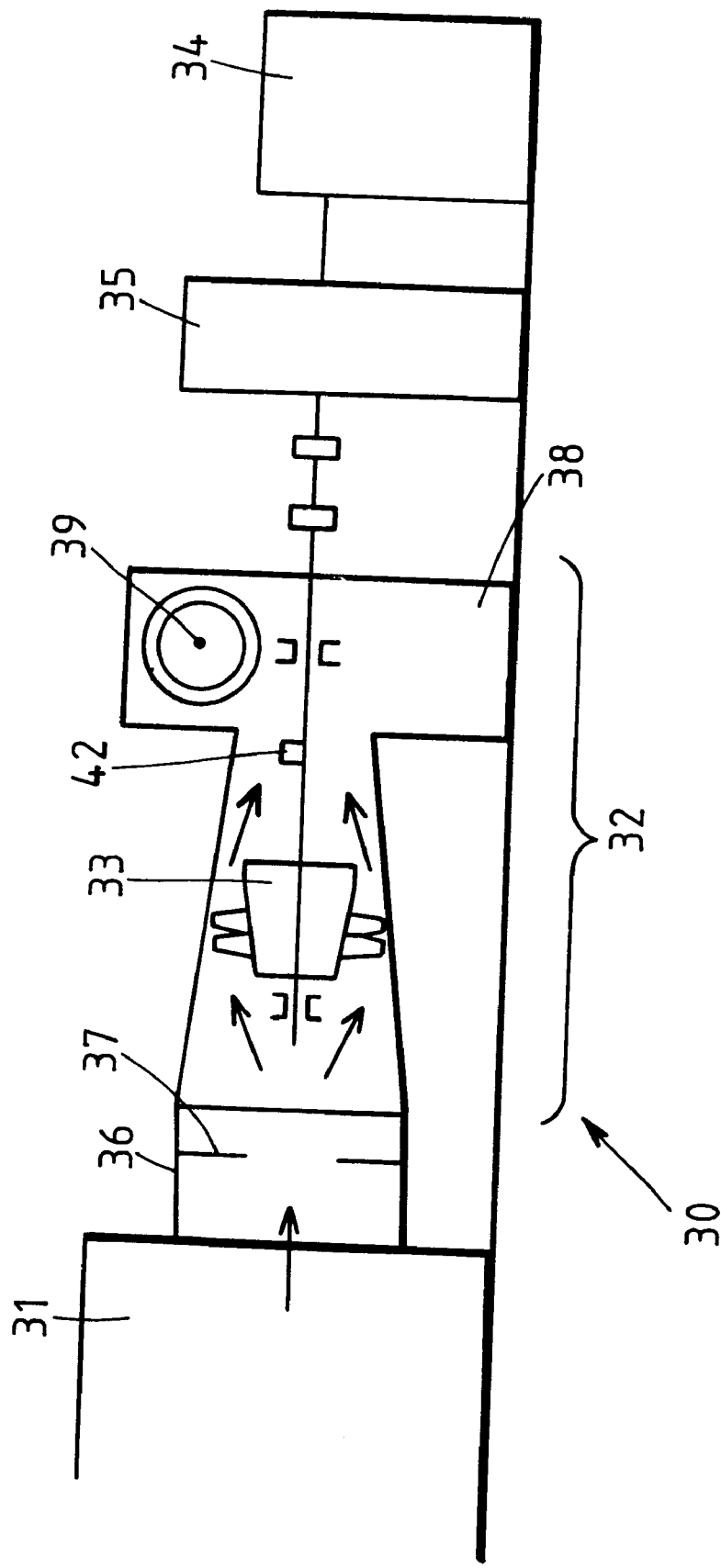
FIG. 12 is a schematic view showing a testing device used for a performance test of the embodiment and a comparative example.

A trailing edge shock wave type boundary layer control tandem blade lattice (embodiment) shown in Table 1 was fabricated with a shape and a dimension shown in FIGS. 7 to 10, and performance thereof was measured by a testing device 30 shown in FIG. 12.

A blade lattice (comparative example) according to the prior art shown in Table 2 was fabricated with the same width as that of the tandem blade according to the embodiment, and performance thereof was measured by the same testing device 30 according to the embodiment.

In the testing device 30 shown in FIG. 12, an air flow rectified by a rectifying tank 31 is fed to a specimen 33 provided on a specimen section 32. The specimen 33 is rotated through a speed increasing gear 35 by a drive motor 34 provided on a downstream portion of the air flow. An orifice 37 for measuring an air weight flow is provided on an upstream portion of an inlet duct 36 portion. The reference numeral 38 denotes an exhaust scroll section, and the reference numeral 39 denotes an exhaust port.

Figure 13:
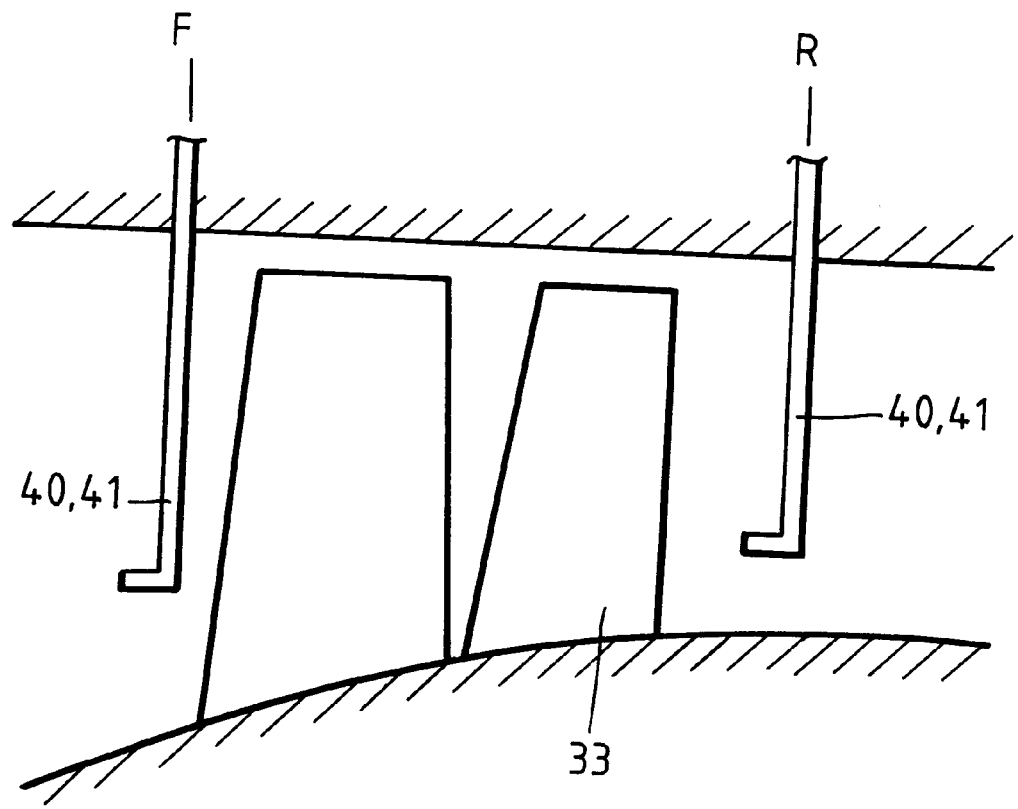
FIG. 13 is a view showing a method for performing measurement using the testing device in FIG. 12.

As typically shown in FIG. 13, measurement was performed by disposing a total pressure measuring probe 40 and a total temperature measuring probe 41 in front and rear portions of the blade(points F and R in FIG. 13) respectively, and radially traversing the probes every millimeter between TIP and HUB sections. An air flow rate was measured by an orifice 37 provided in the upstream of an inlet duct section. The number of revolutions of the blade lattice was measured by a revolution measuring pick-up 42 (See FIG. 12) provided on a rotation shaft of a disk to which the blade lattice is attached.

Each data obtained by the measurement was processed in the following manner.

(1) Each of average measured values of a total pressure and a total temperature between the TIP and HUB sections on the points F and R is calculated.
(2) A pressure ratio is calculated based on a ratio $P_R/P_F$ of an average value $P_R$ of the total pressure on the point R to an average value $P_F$ of the total pressure on the point F.
(3) An average value $T_R$ of the total temperature on the point R and an average value of $T_F$ the total temperature on the point F are also calculated, and the average value $P_R$ of the total pressure on the point R and the average value $P_F$ of the total pressure on the point F which have been calculated are also used to obtain an adiabatic efficiency by the following equation.

$$\eta = T^F(P^R/P^R)^{(k-1)/k-1)}/(T^R - T^F)$$

η: Adiabatic efficiency k: Adiabatic exponent

Table 1 shows a result of measurement in the embodiment, and the pressure ratio and the adiabatic efficiency thus calculated together with principal items of the embodiment. Table 2 shows a result of measurement, the pressure ratio and the adiabatic efficiency in the comparative example.

TABLE 1

| Principal Item | | Measured Value |
| --- | --- | --- |
| Number of blades | Front blade 24 | — |
| | Rear blade 24 | — |
| Diameter of blade tip(mm) | 265 | |
| Number of revolutions(rpm) | 29134 | 29134 |
| Flow rate(kg/s) | — | 5.5 |
| Pressure ratio | — | 2.7 |
| Adiabatic efficiency(%) | — | 87 |

TABLE 2

| Principal Item | | Measured Value |
| --- | --- | --- |
| Number of blades | 24 | — |
| Diameter of blade tip(mm) | 265 | |
| Number of revolutions(rpm) | 29134 | 29134 |
| Flow rate(kg/s) | — | 5.5 |
| Pressure ratio | — | 1.8 |
| Adiabatic efficiency(%) | — | 87 |

It is apparent from a comparison between Table 1 and Table 2 that a high pressure ratio of 2.7 which is about 1.5 times as high as that of the comparative example can be obtained in the embodiment while keeping the same efficiency as in the comparative example.

As described above in detail, when the tandem blade lattice of the present invention is applied to a compressor or the like, performance thereof can be enhanced remarkably.

Although the present invention has fully been described by way of example with reference to the accompanying drawings, it is to be understood that various changes and modifications will be apparent to those skilled in the art. Therefore, unless otherwise such changes and modifications depart from the scope of the invention, they should be construed as being included therein.

What is claimed is:

1. A structure of an output section of a gas turbine engine, comprising:

a disc;

a gas flow section formed at an internal circumference side of the disk;

an air flow section formed at an outer circumference side of the disk, which is isolated from the gas flow section;

wherein said air flow section has a blade lattice, each blade of the blade lattice is a tandem blade including a front blade and a rear blade, and the tandem blade lattice is formed such that a shock wave is generated in a position connecting a vicinity of a leading edge of a lower surface of each front blade to that of a trailing edge of an upper surface of the other front blade adjacent to said front blade.

2. The structure of an output section of a gas turbine engine as defined in claim 1, wherein the tandem blade lattice is formed in such a manner that an air flow spouted onto the upper surface of the rear blade from a gap between the trailing edge of the front blade and a leading edge of the rear blade and each tandem blade maintains a boundary layer on the upper surface of the rear blade.

3. A tandem blade lattice comprising a plurality of tandem blades each of which is formed by a rear blade and a front blade respectively, in which a shock wave is formed in a position connecting a vicinity of a leading edge of a lower surface of each front blade to that of a trailing edge of an upper surface of the other front blade adjacent to said front blade, and a speed and a momentum of an air flow spouted from the trailing edge of the lower surface of the front blade onto the upper surface of the rear blade are regulated such that the air flows go along the upper surface of the rear blade, thereby restricting separation of a boundary layer on the upper surface of the rear blade to a vicinity of a trailing edge.

4. The tandem blade lattice as defined in claim 3, wherein the ratio of a gap defined between the lower surface of the trailing edge region of the front blade and the upper surface of the leading edge region of the rear blade of each said tandem blade at a hub end of said blades to a gap between adjacent said tandem blades is less than or substantially equal to 0.3.

5. The tandem blade lattice as defined in claim 3, wherein the ratio of a gap defined between the lower surface of the trailing edge region of the front blade and the upper surface of the leading edge region of the rear blade of each said tandem blade at a hub end of said blades to a gap between adjacent said tandem blades is less than or substantially equal to 0.15.

6. The tandem blade lattice as defined in claim 3, wherein the ratio of a gap defined between the lower surface of the trailing edge region of the front blade and the upper surface of the leading edge region of the rear blade of each said tandem blade at a hub end of said blades to a gap between adjacent said tandem blades is less than or substantially in the range of 0.020 to 0.274.

7. The tandem blade lattice as defined by claim 3, wherein the ratio of a gap defined between the lower surface of the trailing edge region of the front blade and the upper surface of the leading edge region of the rear blade of each said tandem blade at positions remote from a hub section to a tip section to a gap defined between the underside of the trailing edge region of the front blade and the upper surface of the leading edge region of the rear blade at the hub section of the tandem blade lattice is to be increased in the range from 1.0 to 2.4.

8. The tandem blade lattice as defined by claim 7, wherein the ratio of a gap defined between the lower surface of the trailing edge region of the front blade and the upper surface of the leading edge region of the rear blade of each said tandem blade at positions remote from a hub section to a tip section to a gap defined between the underside of the trailing edge region of the front blade and upperside of the leading edge region of the rear blade at the hub section of the tandem blade lattice is to be increased in the range from 1.0 to 2.4.

9. A tandem blade lattice comprising a plurality of tandem blades each of which is formed by a rear blade and a front blade respectively, in which a shock wave is formed in a position connecting a vicinity of a leading edge of a lower surface of each front blade to that of a trailing edge of an upper surface of the other front blade adjacent to said front blade.

10. The tandem blade lattice as defined in claim 9, wherein the ratio of a gap defined between the lower surface of the trailing edge region of the front blade and the upper surface of the leading edge region of the rear blade of each said tandem blade at a hub end of said blades to a gap between adjacent said tandem blades is less than or substantially equal to 0.3.

11. The tandem blade lattice as defined in claim 9, wherein the ratio of a gap defined between the lower surface of the trailing edge region of the front blade and the upper surface of the leading edge region of the rear blade of each said tandem blade at a hub end of said blades to a gap between adjacent said tandem blades is less than or substantially equal to 0.3.

12. The tandem blade lattice as defined in claim 9, wherein the ratio of a gap defined between the lower surface of the trailing edge region of the front blade and the upper surface of the leading edge region of the rear blade of each said tandem blade at a hub end of said blades to a gap between adjacent said tandem blades is less than or substantially in the range of 0.020 to 0.274.

13. The tandem blade lattice as defined by claim 9, wherein the ratio of a gap defined between the lower surface of the trailing edge region of the front blade and the upper surface of the leading edge region of the rear blade of each said tandem blade at positions remote from a hub section to a tip section to a gap defined between the underside of the trailing edge region of the front blade and the upper surface of the leading edge region of the rear blade at the hub section of the tandem blade lattice is to be increased in the range from 1.0 to 2.4.

14. The tandem blade lattice as defined by claim 13, wherein the ratio of a gap defined between the lower surface of the trailing edge region of the front blade and the upper surface of the leading edge region of the rear blade of each said tandem blade at positions remote from a hub section to a tip section to a gap defined between the underside of the trailing edge region of the front blade and upperside of the leading edge region of the rear blade at the hub section of the tandem blade lattice is to be increased in the range from 1.0 to 2.4.

* * * * *

UNITED STATES PATENT AND TRADEMARK OFFICE
CERTIFICATE OF CORRECTION

PATENT NO. : 6,099,249
DATED : August 8, 2000
INVENTOR(S) : Keisuke Hashimoto

It is certified that error appears in the above-identified patent and that said Letters Patent is hereby corrected as shown below:

Column 5,
Line 14, "D/a (HUB)" should be replaced with -- a(HUB)/D --;
Line 18, "D/a (HUB)" should be replaced with -- a(HUB)/D --;
Line 21, "D/a (HUB)" should be replaced with -- a(HUB)/D --; and FIG. 6,
"a(HUB)/D" should be replaced with -- a(HUB)/D = 0.020 --.

Signed and Sealed this

Thirtieth Day of October, 2001

Attest:

NICHOLAS P. GODICI
Attesting Officer
Acting Director of the United States Patent and Trademark Office